Inventor:
Harry H. Vanderzee
by
Atty.

Patented June 3, 1947

2,421,530

UNITED STATES PATENT OFFICE 2,421,530

LUBRICATOR FOR IDLER BEARINGS

Harry H. Vanderzee, Racine, Wis., assignor to Joy Manufacturing Company, a corporation of Pennsylvania Application June 28, 1944, Serial No. 542,532

8 Claims. (Cl. 308—104)

This invention relates to lubricators and more particularly to improvements in lubricators of the wick or swab type for a rotary element such as a chain idler sprocket.

In chain sprockets such as chain idler sprockets at the outer end of a mining machine cutter bar, considerable difficulty has been encountered in the adequate lubrication of the sprocket bearing. In such constructions the cutter chain travels along the margin of the cutter bar, and the idler sprocket guides the chain as it passes around the curved end of the bar. In such an arrangement the idler sprocket is heavily loaded at the side around which the cutter chain passes, and the opposite side thereof is under substantially no load so that a slight clearance is present between the sprocket and its bearing at the non-loaded side. It is desired to take advantage of this slight clearance to lubricate adequately the sprocket bearing, and according to the invention a wick or swab type lubricator is so arranged as to effect a controlled supply of lubricant to the clearance space so that the sprocket bearing is adequately lubricated.

An object of the present invention is to provide an improved lubricator. Another object is to provide an improved wick or swab type lubricator arranged in a novel manner. A further object is to provide an improved lubricator for a rotary driven member which receives it load at one side and wherein lubricant is supplied in an improved manner to the bearing for the driven member at the non-loaded side thereof. Yet another object is to provide an improved lubricator for a chain sprocket whereby the sprocket bearing is adequately supplied with lubricant. A still further object is to provide an improved lubricator of the wick or swab type for the idler sprocket of the cutter chain on a mining machine cutter bar. Yet another object is to provide an improved wick or swab type lubricator of a novel design and arranged in a novel manner. These and other objects and advantages of the invention will, however, hereinafter more fully appear.

In the accompanying drawing there is shown for purposes of illustration one form which the invention may assume in practice.

In this illustrative construction, the improved lubricator generally designated 1, is shown associated with the chain idler sprocket 2 for the cutter chain 3 on a mining machine cutter bar, generally designated 4. It will be evident, however, that the invention may be incorporated in various other devices.

Figure 1:
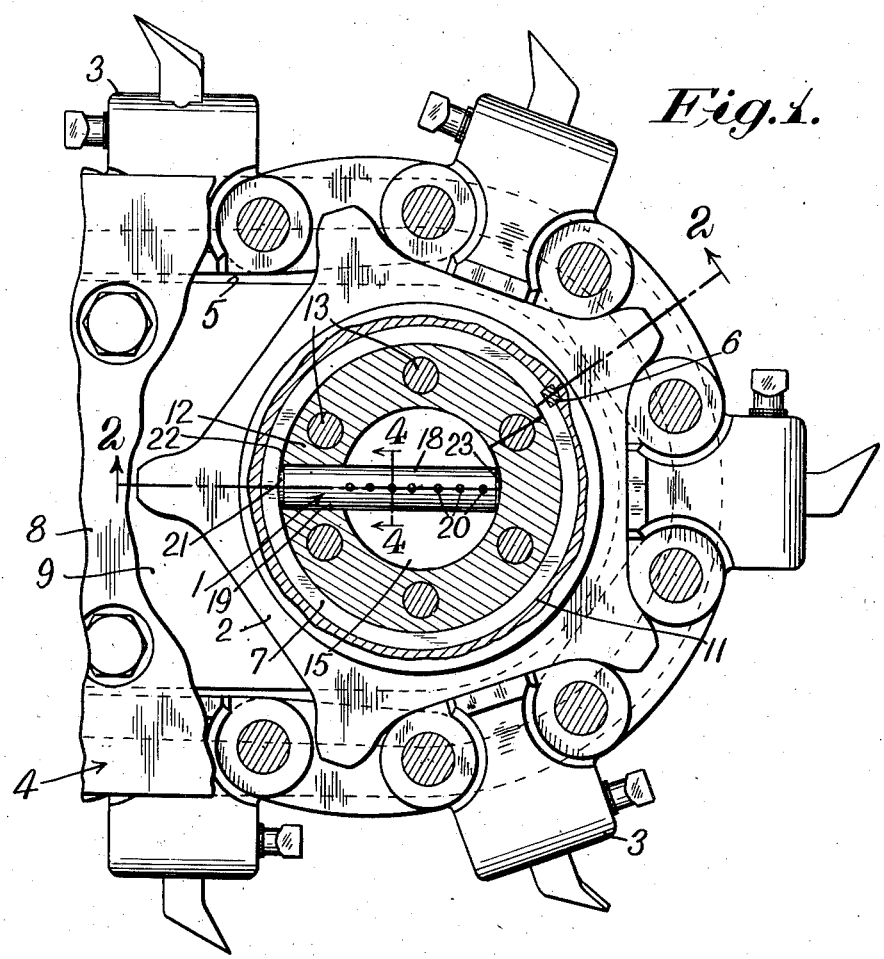
Fig. 1 is a horizontal sectional view taken through the cutter bar of a mining machine, showing the improved lubricator for supplying lubricant to the idler sprocket bearing.
Figure 2:
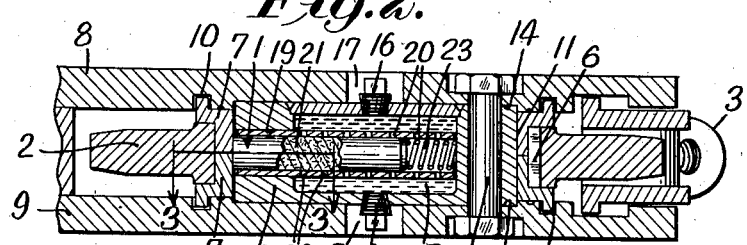
Fig. 2 is a view in longitudinal vertical section taken substantially on lines 2—2 of Fig. 1.
Figures 3, 4:
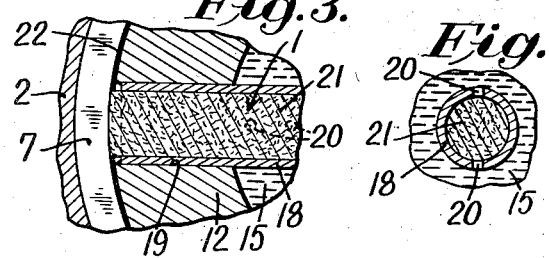
Fig. 3 is an enlarged horizontal sectional view taken substantially on line 3—3 of Fig. 2.
Fig. 4 is an enlarged detail sectional view taken on line 4—4 of Fig. 1.

The cutter bar 4 is of a conventional design and has a guideway 5 extending about its margin along which the cutter chain 3 is guided for orbital movement, and the idler sprocket 2 is arranged at the outer curved end of the cutter bar for guiding the cutter chain as it passes thereabout. The idler sprocket 2 is keyed at 6 to a pair of cooperating, oppositely positioned, identical flanged bearing sleeves 7, 7, and the inner sides of the top and bottom plates 8 and 9 of the cutter bar are annularly grooved at 10 to receive the sleeve flanges, as shown in Fig. 2. The bearing sleeves provide the annular hub of the idler sprocket, and the hub is journaled on the cylindrical bearing surface 11 of a circular bearing member 12 rigidly secured as by bolts 13 to the cutter bar. This circular member 12 is arranged between the top and bottom bar plates 8 and 9, and the plates are circularly recessed at 14 at their inner sides to receive the opposite sides of the circular member, thereby properly to position the latter on the cutter bar. The circular member 12 is preferably made hollow at 15 to provide a lubricant reservoir having filler plugs 16 at the opposite sides of the cutter bar, and the bar plates have openings 17 to permit access to the filler plugs. Supported by the circular member 12 and projecting into the reservoir is the improved lubricator 1 which includes a tube 18 secured as by welding in a bore 19 in the member 12. This tube is perforated at 20 and has arranged therein a wick or swab 21 of a porous material. This wick, at its outer end, contacts the inner bearing surfaces of the sleeves 7 which provide a sprocket hub, at a point opposite the loaded side of the sprocket. Thus lubricant is supplied at a controlled rate by the capillary action of the porous wick, from the reservoir to a slight clearance space 22 (shown exaggerated so that it may be more readily seen) which is present at the non-loaded side of the sprocket. A coil spring 23 within the tube 18 acts on the wick to force the latter toward the sprocket hub and serves to compensate for any wear of the wick.

It will be evident that various suitable types of lubricators may be employed to supply lubricant to the clearance space.

By arranging the lubricator in the improved manner disclosed and effecting the supply of lubricant to the slight clearance space at the non-loaded side of the sprocket hub bearing, the lubrication of the idler sprocket is materially improved. By the provision of a wick or swab, the flow of lubricant is controlled in an effective manner since flow which occurs from the reservoir to the sprocket bearing is a result of capillary action of the porous wick. By supplying lubricant to the slight clearance space at the non-loaded side of the sprocket, adequate flow of lubricant to the bearing surfaces is attained. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a bearing member having a cylindrical exterior bearing surface, a rotary element surrounding said bearing member and journaled on said bearing surface, said rotary element being loaded at one side so that a slight clearance space is present between said rotary element and the bearing surface at the non-loaded side of said rotary element, and lubricator means including a lubricant reservoir formed in said bearing member, said bearing member having a radial bore extending from said reservoir to the clearance space, a perforated tube supported at one end in the bore in said bearing member and projecting freely inwardly into said reservoir, and a spring pressed lubricant controlling wick arranged within said tube and engaging the inner surface of said element at a point wherein the clearance is greatest.

2. In combination, a rotatable idler for guiding an endless driven chain, a cylindrical bearing member on which said idler is journaled, said idler being loaded at one side by the chain so that a slight clearance space is present between said idler and said bearing member at the non-loaded side of said idler, and lubricator means arranged within said bearing member for supplying lubricant to said clearance space, said lubricating means comprising a lubricant reservoir formed in said bearing member internally of the idler bearing surface and a radial opening connecting said reservoir with the clearance space.

3. In combination, a support member, a rotatable idler for guiding and supporting a flexible element journaled on said support member, an endless flexible element guided by said idler, said idler guiding said flexible element as it passes around the same, and a lubricator carried within said support member for supplying lubricant to the idler bearing surface at the non-loaded side thereof opposite the zone of contact with said flexible element, said lubricator comprising a lubricant reservoir arranged internally of the bearing surface of said idler, and a passage opening through the non-loaded side of said idler bearing surface for conducting lubricant from said reservoir to the idler bearing.

4. In combination, a support member, a rotatable idler for guiding and supporting a flexible element journaled on said support member, an endless flexible element guided by said idler, said idler guiding said flexible element as it passes around the same, and a lubricator carried within said support member and surrounded by said idler for supplying lubricant to the idler bearing surface at the non-loaded side thereof opposite the zone of contact with said flexible element, said lubricator comprising a lubricant reservoir arranged internally of the bearing surface of said idler and a passage opening through the non-loaded side of said idler bearing surface for conducting lubricant from said reservoir to the idler bearing.

5. In combination, a support member, a rotatable idler for guiding and supporting a flexible element journaled on said support member and having an internal bearing surface, an endless flexible element guided by said idler, said idler guiding said flexible element as it passes around the same, a circular bearing support arranged within and secured to said support member, said bearing support providing a cylindrical bearing surface on which said idler is journaled, said idler being loaded at its side which is in contact with said flexible element so that a slight clearance space is provided between said internal bearing surface of said idler and said bearing support at the non-loaded side of said idler opposite the zone of contact with said flexible element, a lubricant reservoir within said bearing support, said support having a bore extending between said reservoir and said clearance space, and flow controlling means comprising a wick arranged in said bore and extending into said reservoir for controlling flow of lubricant from said reservoir to said clearance space.

6. In combination, a support member, a rotatable idler for guiding and supporting a flexible element journaled on said support member and having an internal bearing surface, an endless flexible element guided by said idler, said idler guiding said flexible element as it passes around the same, a circular bearing support arranged within and secured to said support member, said bearing support providing a cylindrical bearing surface on which said idler is journaled, said idler being loaded at its side which is in contact with said flexible element so that a slight clearance space is provided between said internal bearing surface of said idler and said bearing support at the non-loaded side of said idler opposite the zone of contact with said flexible element, a lubricant reservoir within said bearing support, said support having a bore extending between said reservoir and said clearance space, and flow controlling means for controlling the flow of lubricant from said reservoir to said clearance space, said flow controlling member comprising a perforated tube positioned in said bore and projecting into said reservoir and a wick arranged in said tube and engaging said internal bearing surface of said idler at a point where the clearance is greatest.

7. In combination, a support member comprising spaced plates, a rotatable idler for guiding and supporting a flexible element journaled on said support member, an endless flexible element guided by said idler, said idler guiding said flexible element as it passes around the same, a circular relatively narrow bearing member arranged between and secured to said plates and having an external circular bearing surface providing a bearing for said idler, a lubricant reservoir in said bearing member internally of said bearing surface, said bearing member having a bore extending generally normal to the non-loaded side of said idler bearing surface for conducting lubricant from said reservoir to the bearing surface, and a wick in said bore engaging the bearing surface of said idler and extending into said reservoir.

8. In combination, a support member comprising spaced plates, a rotatable idler for guiding and supporting a flexible element journaled on said support member, an endless flexible element guided by said idler, said idler guiding said flexible element as it passes around the same, a circular relatively narrow bearing member arranged between and secured to said plates and having an external circular bearing surface providing a bearing for said idler, a lubricant reservoir in said bearing member internally of said bearing surface, said bearing member having a bore extending generally normal to the non-loaded side of said idler bearing surface for conducting lubricant from said reservoir to the bearing surface, a perforated tube supported at one end in said bore and projecting inwardly into said reservoir, a wick in said tube engaging the bearing surface of said idler, and a spring arranged within the opposite end of said tube for yieldingly urging said wick into engagement with the idler bearing surface.

HARRY H. VANDERZEE.

REFERENCES CITED

The following references are of record in the file of this patent:

UNITED STATES PATENTS

| Number | Name | Date |
| --- | --- | --- |
| 1,130,360 | Wilder | Mar. 2, 1915 |
| 799,020 | Strause | Sept. 5, 1905 |
| 1,074,834 | Cartlidge | Oct. 7, 1913 |
| 1,884,986 | Weld et al. | Oct. 25, 1932 |